United States Patent [19]

Nilsson

[11] Patent Number: 5,463,966
[45] Date of Patent: Nov. 7, 1995

[54] FRAMEWORK FOR SHELVING UNIT

[75] Inventor: Finn Nilsson, Sharkston, Canada

[73] Assignee: Spacemaker Limited, Canada

[21] Appl. No.: 41,508

[22] Filed: Apr. 1, 1993

[30]  Foreign Application Priority Data

Apr. 1, 1992 [CA] Canada .................................. 2064656
Aug. 5, 1992 [CA] Canada .................................. 2075320

[51] Int. Cl.⁶ ..................................................... A47B 9/00
[52] U.S. Cl. ........................ 108/110; 108/193; 108/144
[58] Field of Search ................................. 108/110, 193, 108/192, 180, 91; 211/192, 187

[56]  References Cited

U.S. PATENT DOCUMENTS

| | | | |
|---|---|---|---|
| 490,288 | 1/1893 | Hubbard et al. | 108/110 |
| 2,952,409 | 4/1960 | Winoman, Jr. | 211/187 X |
| 3,303,937 | 2/1967 | McConnoll | 211/187 X |
| 3,702,137 | 11/1972 | Evans | 211/187 X |
| 4,064,995 | 12/1977 | Bustos | 108/193 X |
| 4,423,817 | 1/1984 | Monjo-Rufi | 211/187 |
| 4,949,648 | 8/1990 | Millon | 211/187 X |
| 4,967,916 | 11/1990 | Handcon et al. | 211/187 |

FOREIGN PATENT DOCUMENTS

| | | |
|---|---|---|
| 0822660 | 3/1973 | Belgium . |
| 1294322 | 4/1962 | France . |
| 2392627 | 12/1978 | France . |
| 2461841 | 2/1981 | France . |
| 178984 | 5/1922 | United Kingdom ................... 108/110 |
| 0856474 | 12/1960 | United Kingdom . |
| 0864123 | 3/1961 | United Kingdom . |

*Primary Examiner*—Jose V. Chen
*Attorney, Agent, or Firm*—Ladas & Parry

[57]  ABSTRACT

A framework comprising a plurality of vertical posts, a plurality of horizontal members and a locking attachment for connecting the horizontal members to the vertical posts, the vertical posts being provided with a plurality of key hole shaped apertures oriented at an acute angle to vertical, and a head and stem portion adapted to extend from each of the horizontal members for interconnection with the key hole shaped apertures such that the vertical edge of each horizontal member is force fit connected to a respective one of the vertical posts.

38 Claims, 8 Drawing Sheets

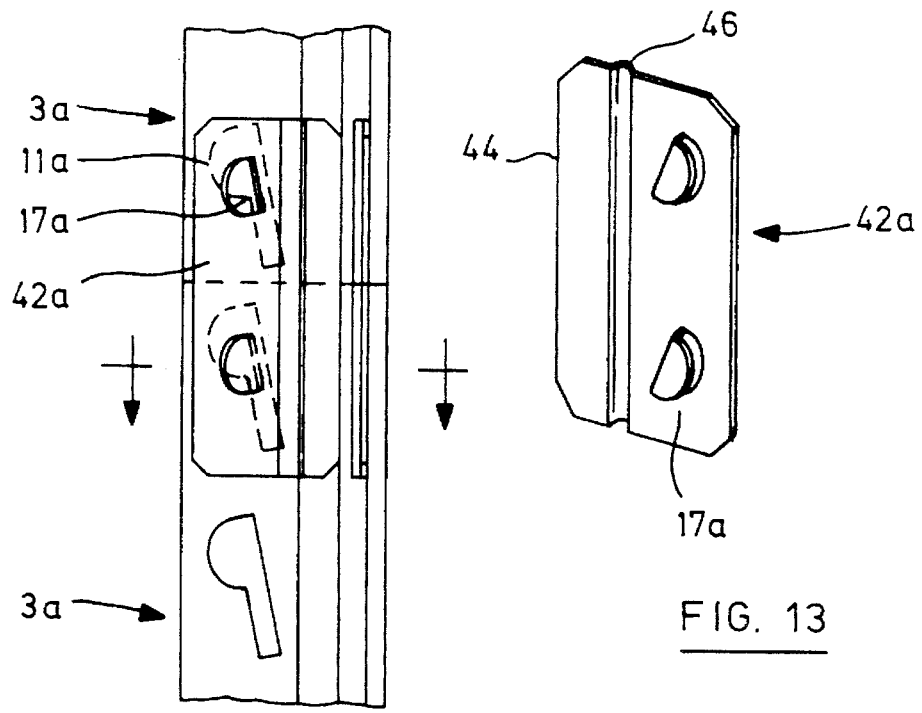
FIG. 12
FIG. 13
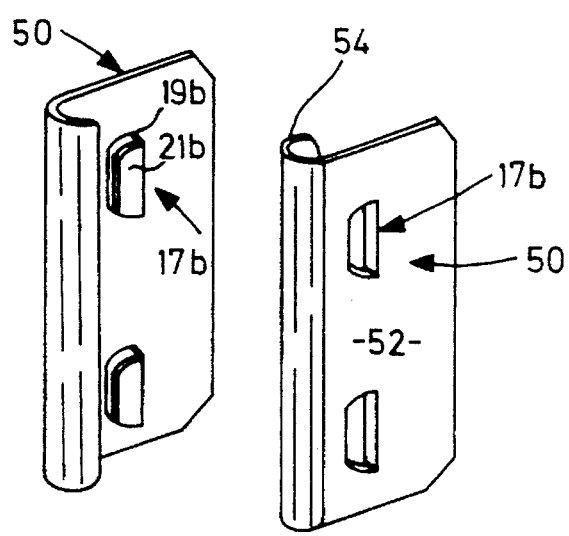
FIG. 15

5,463,966

FRAMEWORK FOR SHELVING UNIT

This invention relates in general to a framework suitable for use as a shelving unit and more particularly to a framework which may be readily assembled and disassembled by a user.

It is known in the prior art to provide a framework which may be used as the basis of a shelving unit work bench or similar structure and which may be assembled and disassembled for ease of transportation. Such frameworks are often used in warehouses and storage rooms and are fabricated from sheet metal which may be roll formed, stamped and cut to the desired shape for assembly. These frameworks are typically provided with four vertical corner posts and a plurality of horizontal members. The corner posts are often provided with a plurality of apertures for receiving screws or bolts to connect the horizontal members thereto at user selected heights.

For example, Canadian Patent 1,256,069 (Hirsh Company) discloses a shelving assembly having a plurality of generally horizontal shelves which are connected to four support columns or posts by conventional bolts or nuts. Specifically, each shelf is provided with a flange which defines, at its corners, one or more holes for receiving a bolt or screw which is then inserted through a selected hole or aperture in the vertical column or post.

One disadvantage of the prior art design disclosed in the Hirsh Patent is that there are a multiplicity of components required for assembly, including the aforementioned nuts and bolts, as well as pliers and screwdrivers, etc. Furthermore, it is possible for the nuts and bolts to become loosened over time, thereby resulting in potential instability of the shelving assembly.

According to another prior art technique, the horizontal members are connected to the vertical posts by means of rivets. The rivets are inserted in vertically arranged slots in the vertical posts. In an effort to provide a secure connection, the distance from the side edge (i.e. vertical face) of the vertical post to the side edge of the slot is made slightly different to the distance from the side edge (i.e. vertical edge) of the horizontal member to the neck of the rivet such that there is effectively no clearance between the rivet and the slot. Therefore, in order to install the rivet into the slot, the rivet must be hammered into place by hammering down on the horizontal member so as to distort the metal forming the side edge of the slot.

This latter prior art technique also suffers from the disadvantage that the shelving unit is difficult to assemble. Furthermore, the connection of the rivet and slot edge is in the form of a single point connection which may become loosened with time as with the prior art Hirsh unit, thereby resulting in potential instability of the shelving unit.

According to the present invention, a framework is provided which is characterized by an interference fit between the overlapping portions of support members and post members resulting in extremely stable construction.

In particular, the framework of the present invention comprises a plurality of post members mutually spaced from one another in generally parallel relationship and each including a pair of faces disposed perpendicular to one another. A plurality of support members are provided to extend between pairs of said post members. Each of said support members includes an abutment face delimited at opposite ends by an edge extending normal to the longitudinal axis of the support member. Attachment means are provided for connecting the support members to the post members so that the abutment face of the support member overlies a portion of a face of the post. The attachment means comprises a generally keyhole-shaped aperture in one of said overlapping faces having a hole and slot extending therefrom at a predetermined acute angle to the longitudinal axis of the associated member, and a neck and a head portion extending from the neck projecting from the other of the overlapping faces, the head portion being co-operatively shaped for insertion through the hole and the neck being co-operatively shaped to slide within the slot, whereby upon inserting the neck portion through the hole the neck slides within the slot to bring said edge of the support member into abutment with an abutment surface on the post member and further sliding of the neck within the slot is inhibited.

A detailed description of an embodiment of the invention is provided below with reference to the following drawings, in which FIG. 1 is a perspective view of the knock-down shelving unit;

FIG. 12 is a view of the components shown in FIG. 11 assembled;

FIG. 13 is a perspective view of a connector used to connect the legs as shown in FIG. 12;

FIG. 15 is a perspective view of connectors used in connecting the legs as shown in FIG. 14.

Figure 1:
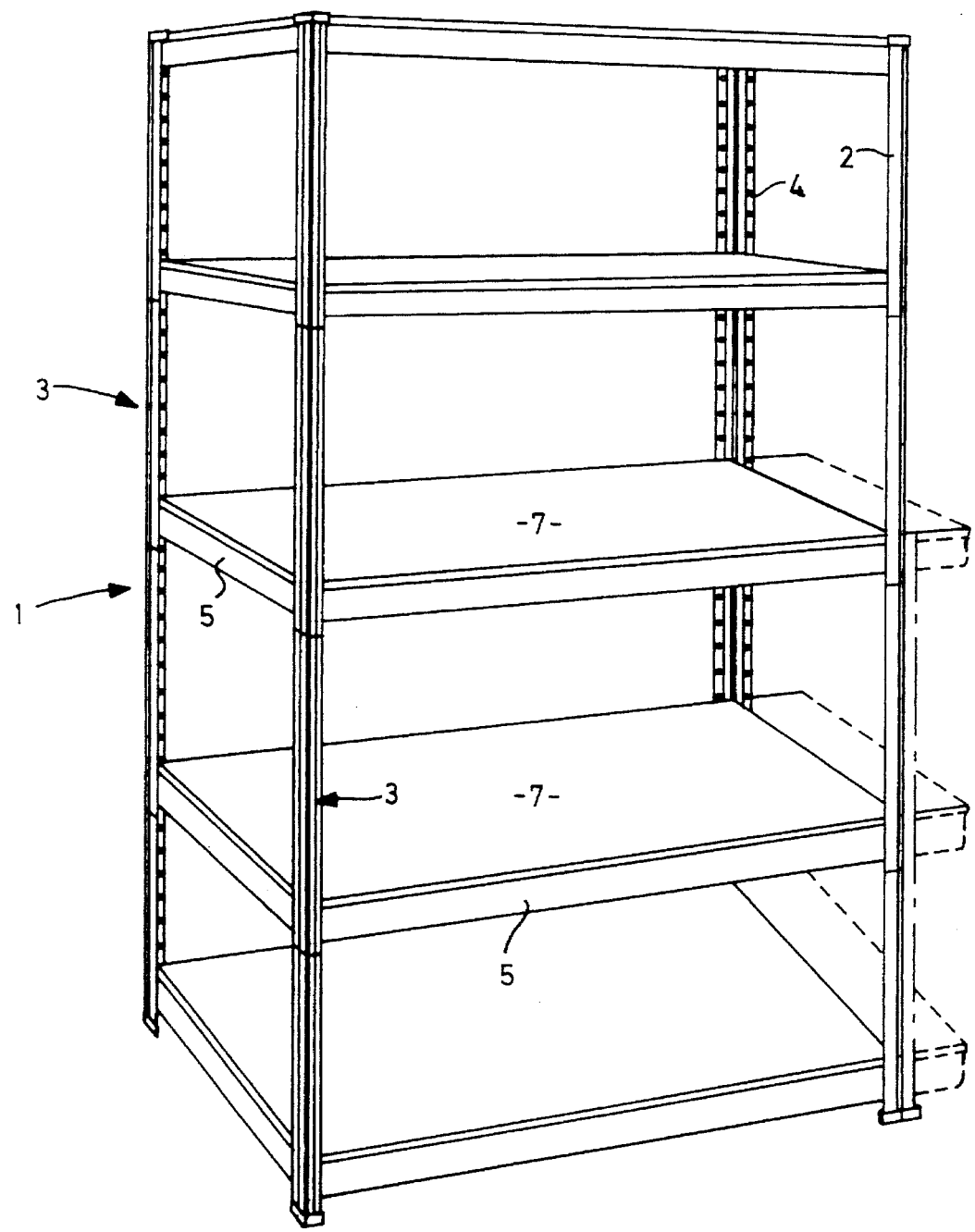
Figure 2:
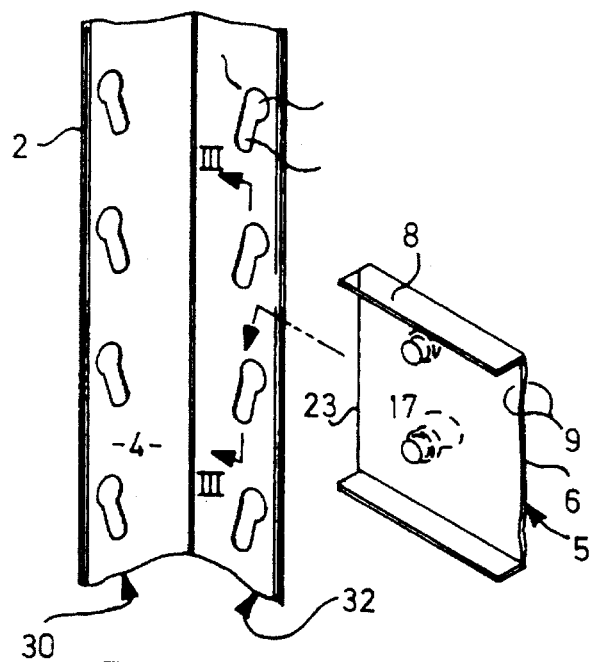
FIG. 2 is an enlarged perspective view showing the components of the unit in FIG. 1 prior to assembly.
Figure 3:
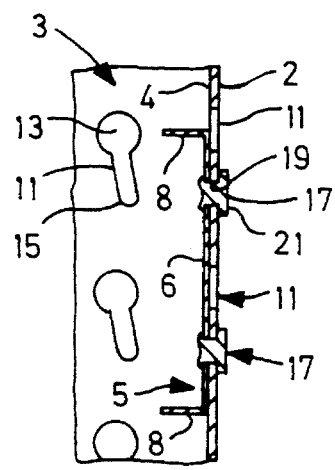
FIG. 3 is a cross sectional view through III—III in FIG. 2 with the components assembled.

Turning therefore to FIGS. 1 to 3, an assembled shelving unit 1 is shown comprising four vertical posts 3 each having a pair of legs 30,32 disposed perpendicular to one another. Each of the legs 30,32 has a pair of oppositely directed faces 2,4. A plurality of horizontal support members 5 extends between respective pairs of the legs 3 and is attached to the legs in a manner to be described below to provide a stable structure.

The horizontal support members 5 are each formed as channels with a vertical web 6 with a pair of oppositely directed surfaces 9 and horizontal ledges 8. The web 6 and ledges 8 terminate in a vertical edge 23.

Shelves 7 rest on the ledges 8 of the horizontal members 5 to complete the unit. Cross bracing members (not shown) may be provided for additional stability. However, the inherently stable nature of the shelving unit described substantially alleviates the requirement for cross bracing.

As shown in greater detail with reference to FIGS. 2 and 3, the legs 30, 32 of each vertical post 3 are each provided with a plurality of key hole shaped apertures 11 each comprising a generally circular hole 13 and a slot 15 oriented at an acute angle to the longitudinal axis of the post 3. This angle is preferably in the range of from 80 to 300, and more preferably is 101 from vertical.

Each horizontal member 5 includes at least one attachment connector 17 to attach the member 5 to a respective post 3. In the embodiment of FIG. 2 and 3, the connector 17 comprises a neck 19 and head portion 21. Preferably, there are two attachment connectors 17 associated with each end of the horizontal member 5. In the embodiment of FIG. 2 and 3, the neck 19 and head portion 21 are in the form of a rivet which may be installed in the horizontal member 5 during fabrication thereof. Alternatively, the neck 19 and head portion may be stamped or punched from the sheet metal horizontal member 5 so as to be integral therewith.

In operation, the attachment means 17 are inserted through respective key hole apertures 11 such that the head portion 21 passes through the circular hole 13. When initially inserted, the outwardly directed face 9 of the web 6 overlies and abuts a face 4 of one of the legs, for example 32, and the vertical edge 23 of the horizontal member 5 is slightly spaced from the adjacent face 4 of the other leg 30 of the post 3. Downward pressure is then applied to the horizontal member 5 such that the neck 19 slides downwardly within slot 15. Since the slot 15 is disposed at an angle, the clearance between the edge 23 and the face 4 diminishes until they abut. Additional downward pressure produces a wedging action that results in an interference fit between horizontal member 5 and vertical post 3. The interference fit between horizontal member 5 and vertical post 3 extends over the full length of the edge 23 rather than forming a single point connection as in the prior art, thereby resulting in a firm interconnection. However, the shelving unit assembled in accordance with the preferred embodiment of FIGS. 2 and 3 may nonetheless be disassembled by applying upward force to the horizontal member 5 for dislodging the horizontal member from the vertical post 3.

As discussed above, the angle of inclination of the slot 15 may vary within a preferred range of acute angles (although a 10° angle of inclination has been determined through experimentation to be optimum). As the angle of inclination increases, the wedging action between the slot 15 and neck 19 is reduced but a larger tolerance during assembly is obtained. Conversely, as the angle of inclination of slot 15 is made less, the tightness of the interference fit increases but the tolerance requirements are also increased.

According to a successful prototype, the head portion 21 is in the form of a circular disk having a diameter of approximately 7/16 and a thickness of approximately 0.005". The neck 19 is in the form of a circular cylinder having a diameter of approximately 0.240", and the length of the neck 19 from the base to the head portion 21 is approximately 0.08". The hole 13 is preferably circular and has a diameter of approximately 0.0500" and the slot 15 is generally oblong and has a width of approximately 0.250" and a length of approximately 0.500" extending from the centre of focus of the oblong to the center of the hole 13. However, other dimensions of these components are possible.

Figure 4:
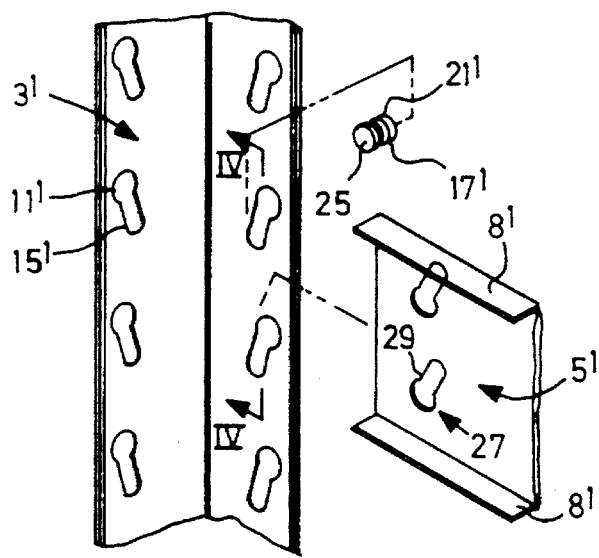
FIG. 4 is a view similar to FIG. 2 of an alternative embodiment of shelving unit.
Figure 5:
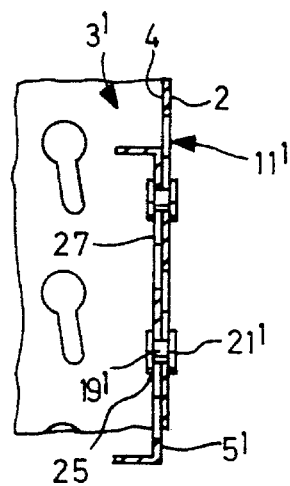
FIG. 5 is a section on the line V—V of FIG. 4 with the components assembled.
Figure 6:
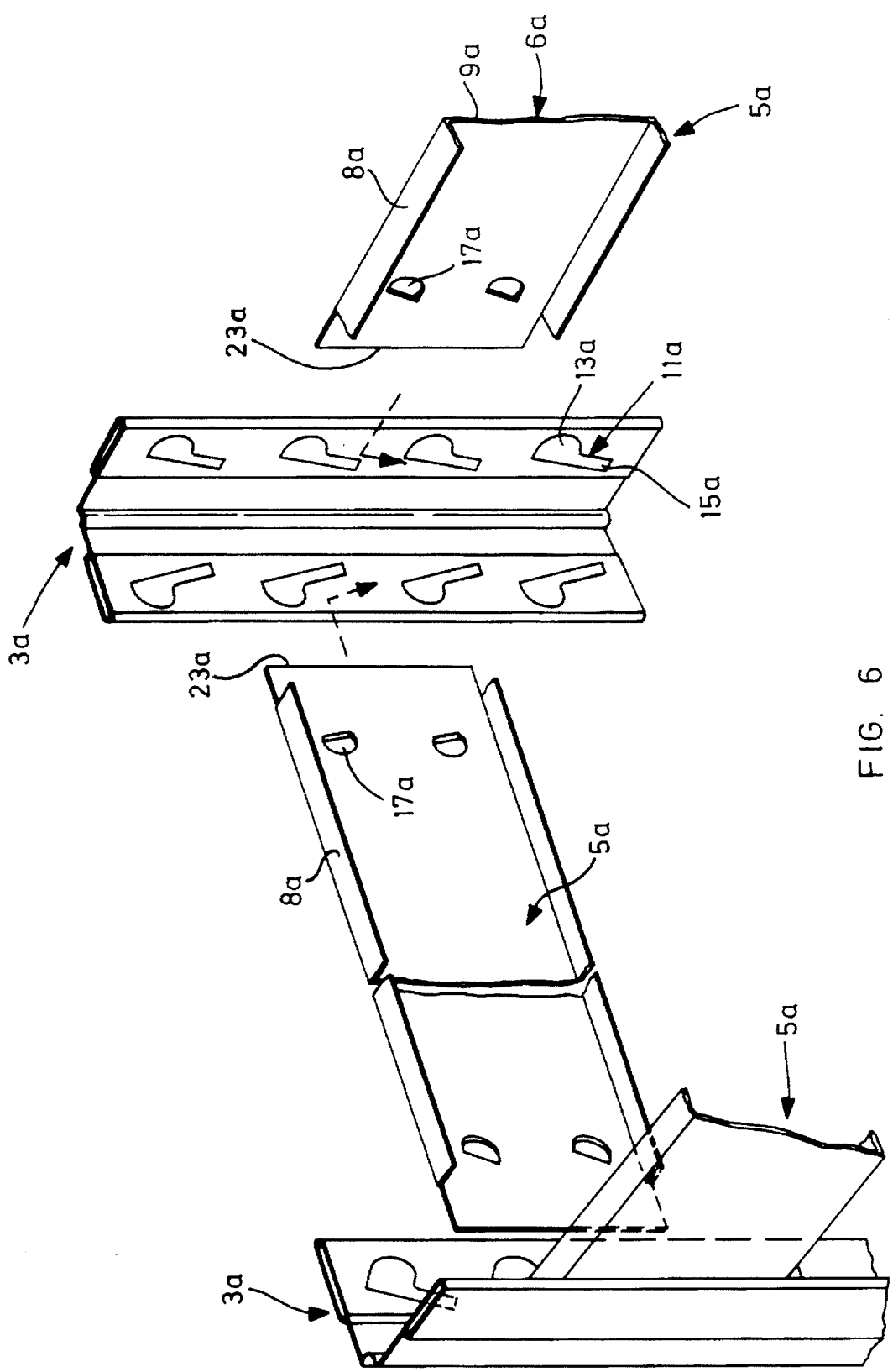
FIG. 6 is an exploded perspective view of a further embodiment of shelving unit.
Figure 7:
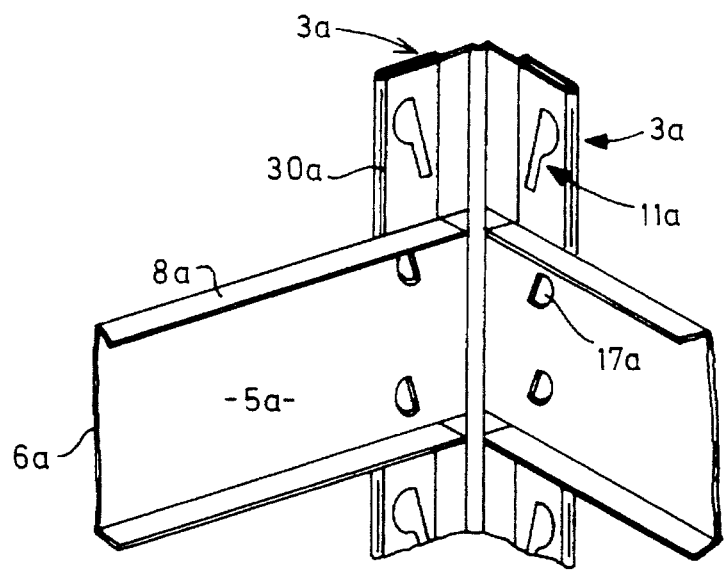
FIG. 7 is a perspective view of the components of FIG. 6 assembled.
Figures 8A, 8B:
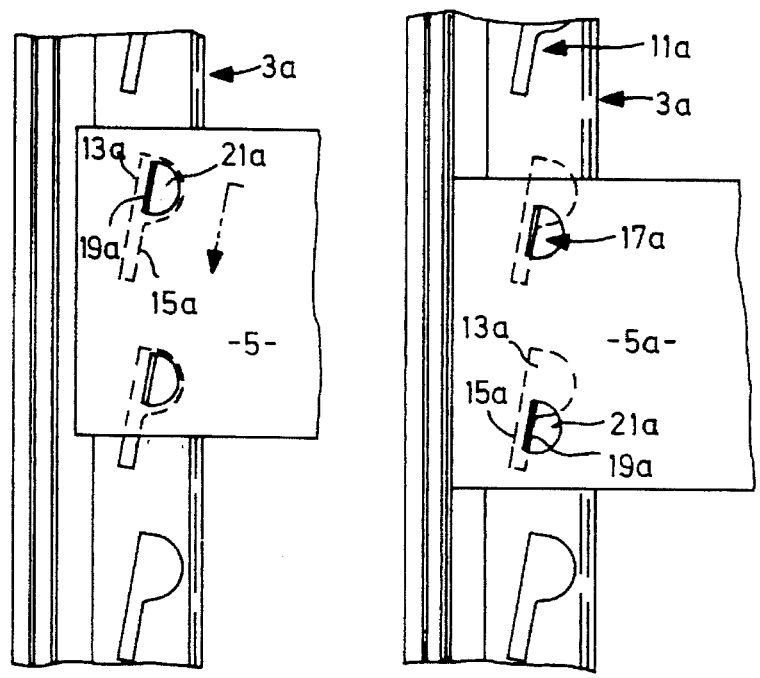
FIGS. 8a and 8b are front elevations of the components of FIG. 6 with FIG. 8a showing the components during initial assembly and FIG. 8b showing the components assembled.
Figure 9:
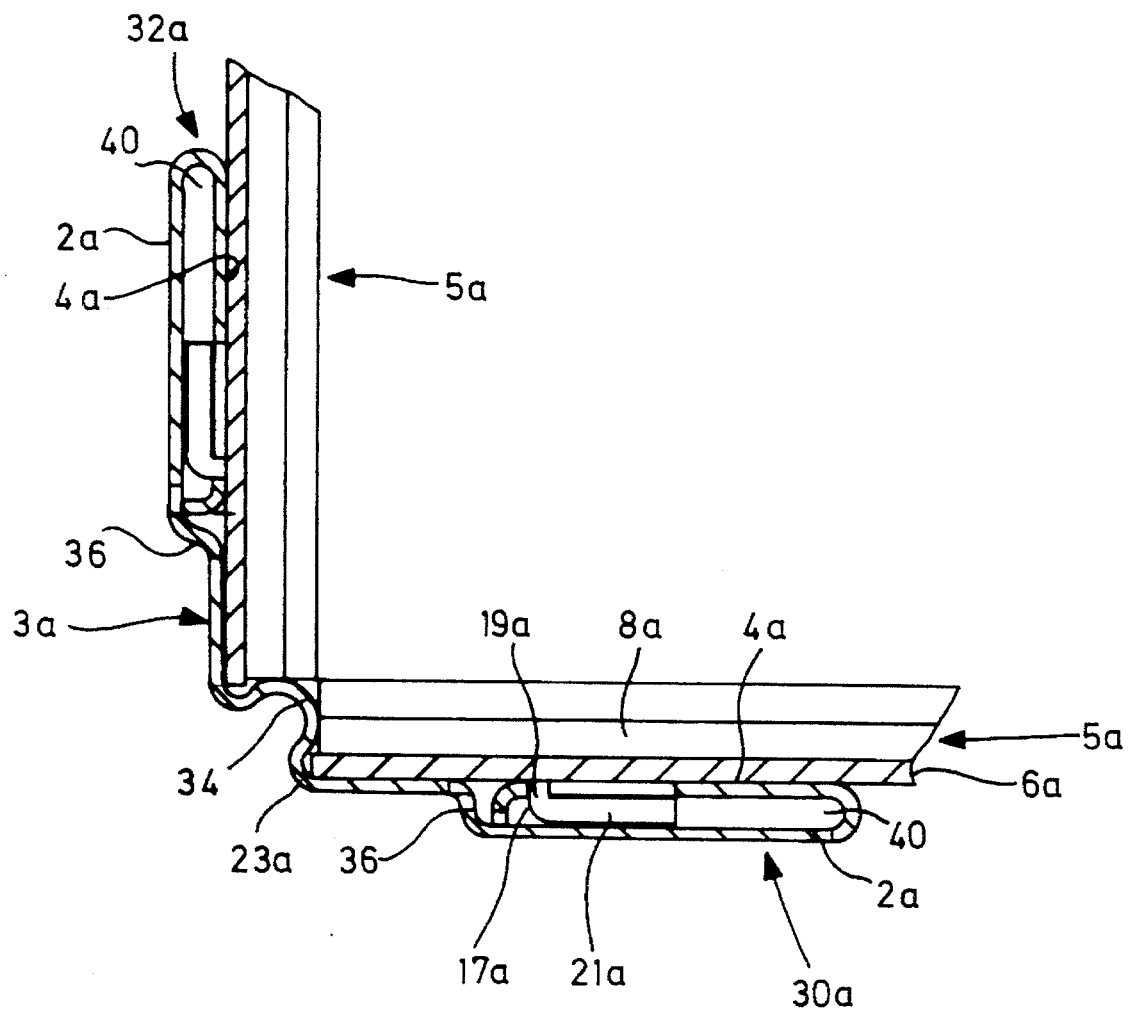
FIG. 9 is a section on the line VIII—VIII of FIG. 8 with the components assembled.

Turning to the alternative embodiment shown in FIGS. 4 and 5, the construction of vertical post 3' is substantially the same as shown in FIG. 2 with the exception that the slot 15' of the keyhole aperture 11' is of generally oblong shape (i.e. with a semi-circular end portion). As an alternative to the rivet attachment means 17 of FIGS. 2 and 3, in the embodiment of FIGS. 4 and 5 an attachment means 17' is provided which is separable from the vertical post 3' and horizontal member 5'. In particular, the attachment means 17' of FIG. 5 is shown comprising a first head portion 21' a neck 19' and further head portion 25, resulting in an overall shape generally similar to a yo-yo which is a adapted to be inserted through key hole apertures 11' in the vertical post 3' and through further key hole aperture 27 in the horizontal member 5'. The neck 19' slides within slots 15' and 29 in response to downward pressure on the horizontal member 5'. As with the embodiment of FIGS. 2 and 3, movement of the neck 19' in the slots results in vertical edge 23' abutting the vertical face 4' of vertical post 3'. When installed, the head portion 21' projects from the apertures 11' and 27 adjacent vertical post 3' while the head portion 25 projects from the apertures 11' and 27 adjacent the horizontal member 5', thereby retaining the attachment means 17' within the two sets of apertures 11' and 27.

According to a successful prototype of the alternative embodiment, the head portions 21 and 25 are in the form of circular disks one having a diameter of approximately 7/16" and the other slightly greater than the diameter of the circular hole 13' and a thickness of approximately 0.005". The neck 19' is in the form of a circular cylinder having a diameter of approximately 0.240", and the distance of the neck 19' separating head portions 21 and 25 is approximately 0.80". By making one of the head portions larger than the hole 13', the enlarged head portion is prevented from passing through the hole 13' after the other head portion has already been inserted.

Furthermore, according to the alternative embodiment of FIG. 4, the hole 13' is preferably circular and has a diameter of approximately 0.500" and the slot 15' is generally oblong and has a width of approximately 0.250" and a length of approximately 0.500" extending from the centre of focus of the oblong to the centre of the hole 13'.

According to the successful prototype, the vertical post 3 (and vertical post 3') and the horizontal member 5 (and alternative horizontal member 5') are fabricated from sheet metal having a thickness of approximately 0.036".

A further embodiment of the invention is shown in FIGS. 6 to 9 in which like components to those shown in FIGS. 1 through 3 will be identified with like reference numerals but with the suffix "a" added for clarity.

In the embodiment of FIGS. 6 through 9, the connectors 17a are stamped from the material forming the web 6a of the horizontal member 5a. As can best be seen in FIG. 9, the connector 17a includes a web of material including a neck 19a disposed generally perpendicular to the web 6a and a semi-circular head 21a disposed generally parallel to the web 6a. The spacing of the head 21a from the face 9a corresponds to the thickness of the material forming the vertical post 3a.

The vertical post 3a is formed with a pair of perpendicular legs 30a,32a which are interconnected by a part-cylindrical rib 34 formed integrally with the legs 30a,32a at the apex of the post 3a. Each of the legs 30a,32a are jogged as indicated at 36, and the distal portion of each leg folded back on itself to provide the oppositely directed vertical faces 2a,4a. It will be noted that the portions of the legs defining the faces 2a,4a are spaced from one another so as to define a cavity 40 in each of the legs 30a,32a. The depth of the cavity 40 is slightly greater than the thickness of the head 21a.

The vertical faces 4a each have a series of keyhole slots 11a having a semi-circular hole 13a and an inclined slot 15a. The shape of the hole 13a corresponds to that of the head 21a and the width of the slot 15a corresponds to the thickness of the neck 19a. As can also be seen from FIGS. 6 to 9, the vertical edge 23a of each of the members 5a projects beyond the horizontal ledges 8a to allow the edge 23a to be received behind the rib 34.

To assemble the horizontal members 5a onto the vertical posts 3a, the outwardly directed face 9a of the web 6a is placed in abutment with one of the vertical faces 4a. The heads 21a are aligned with an appropriate one of the holes 13a so that the head passes through and allows the opposed vertical faces 9a,4a to move into abutment. At this time, the vertical edge 23a of the web 6a is spaced from the rib 34. The horizontal member 5a is then moved downwardly relative to the post 3a to move the neck 19a into the slot 15a. This movement continues until the lateral edges of each of the ledges 8a engage the rib 34 to produce an interference fit and inhibit further downward movement.

Similarly, a second horizontal member 5a can then be assembled on the post 3a against the other of the vertical faces 4a and moved downwardly until its lateral edge 23a is behind the rib 34 and the lateral edges of ledges 8a abut the rib 34. The rib 34 therefore provides an abutment surface for the lateral edges of the ledges so that each of the horizontal members 5a may be assembled independently of the other. However, as the ledges abut the rib 34 at a pair of spaced apart locations a stable connection between the post 3a and the horizontal member 5a is still provided.

As the neck 19a is accomodated within the slot 11a, the head 21a moves within the cavity 40 and inhibits relative horizontal movement between the post 3a and horizontal member 5a. The snug fit of the head within the cavity 40 also inhibits the head 19a from being bent from its parallel position by the application of a horizontal force as any horizontal force would have to extrude the head through the slot rather than simply cause the head to bend relative to the neck and pass through the slot. The location of the edge 23a behind the rib 34 also inhibits outward movement of the horizontal member 5a relative to post 3a to enhance the rigidity of the structure 1a.

It will be seen, therefore, that the embodiment of FIGS. 6 through 9 provides a connection that can be integrally formed with the horizontal member 4a and also permits the two horizontal members 5a to be fitted independently of one another to the post 3a. The inclination of the slot 15a to the vertical is similar to that described above with respect to FIGS. 1 to 5 namely in the range of 8° to 30° and preferably 10°.

The folding back of the limbs 30a, 32a to define the cavity 40 is not only of benefit in retaining the head 21a but also improves the aesthetics of the shelving unit. The outwardly directed faces 2a present an unperforated external face to the posts 3a and hide the keyhole slots 11a when the unit is assembled. This allows the unit to be used in furniture applications as well as more conventional utilitarian applications.

Figures 10, 11:
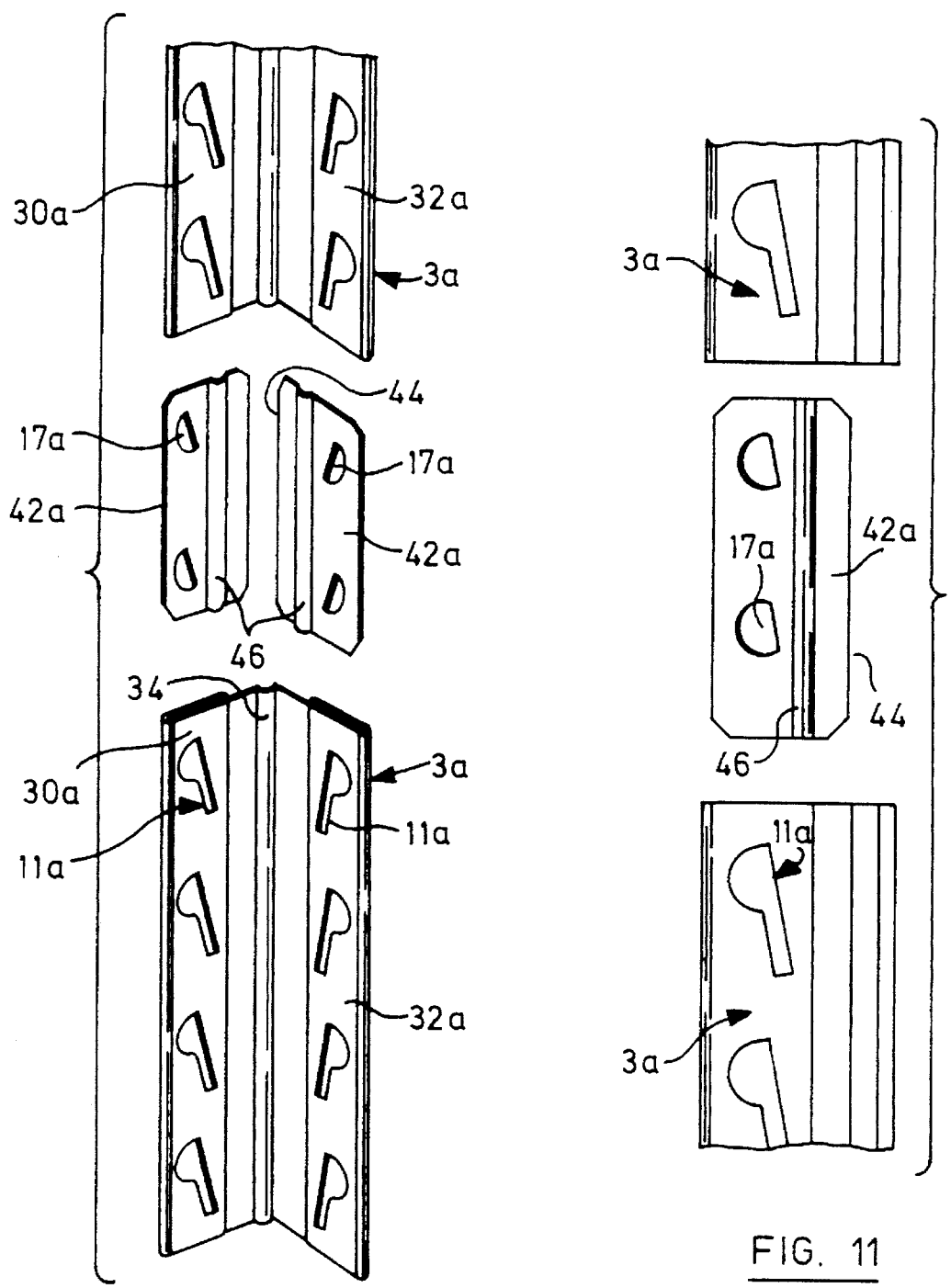
FIG. 10 is an exploded perspective view of a pair of legs as used in the embodiment of FIG. 6 being connected end to end.
FIG. 11 is an elevation of the components shown in FIG. 10.

Although the principal purpose of the attachment 17a is to connect a horizontal member 5a with a post 3a, the attachment may also be used to provide alternative configurations of shelving unit. As shown in FIGS. 10 and 11, the connectors 17a may be used to join a pair of posts 3a end to end without having to overlap the posts 3a. Thus, a bridging member 42 is provided having a pair of connectors 17a that are spaced apart to correspond to the spacing between adjacent apertures 13a. The bridging members 42 are generally rectangular and have a free edge 44, corresponding to the edge 23a of the member 5a, along one side. A rib 46 is formed in the bridging members 42 to stiffen it. It will be noted from FIG. 10 that the bridging members are handed to accomodate the opposite inclination of the slots 15a on the legs 30a, 32a of each post.

A pair of posts 3a are assembled end to end first aligning the posts 3a so that the ends abut and the legs 30a,32a are coplanar. A bridging member 42 is then placed across the join between the two posts 3a so that it is in contact with each face 4 of one of the legs 30a of each post 3a. The connectors 17a are placed in respective apertures 11a, one on each post 3a. The bridging member 42 is then slid axially to bring the edge 44 into engagement with the rib 34 on each of the posts 3a and wedge the bridging member 42.

A second bridging member 42 of opposite hand is then placed across the join and in abutment with each surface 4a of the leg 32a. The bridging member is again slid axially to bring its free edge into contact with the rib 34 and wedge the bridging member 42 onto the leg. With both bridging members engaged, the posts 3a are effectively connected end to end while providing a continuous coplanar outer surface for the posts 3a. Of course, a similar arrangement can be utilized with the post and attachment shown in FIGS. 2 through 5.

Figure 14:
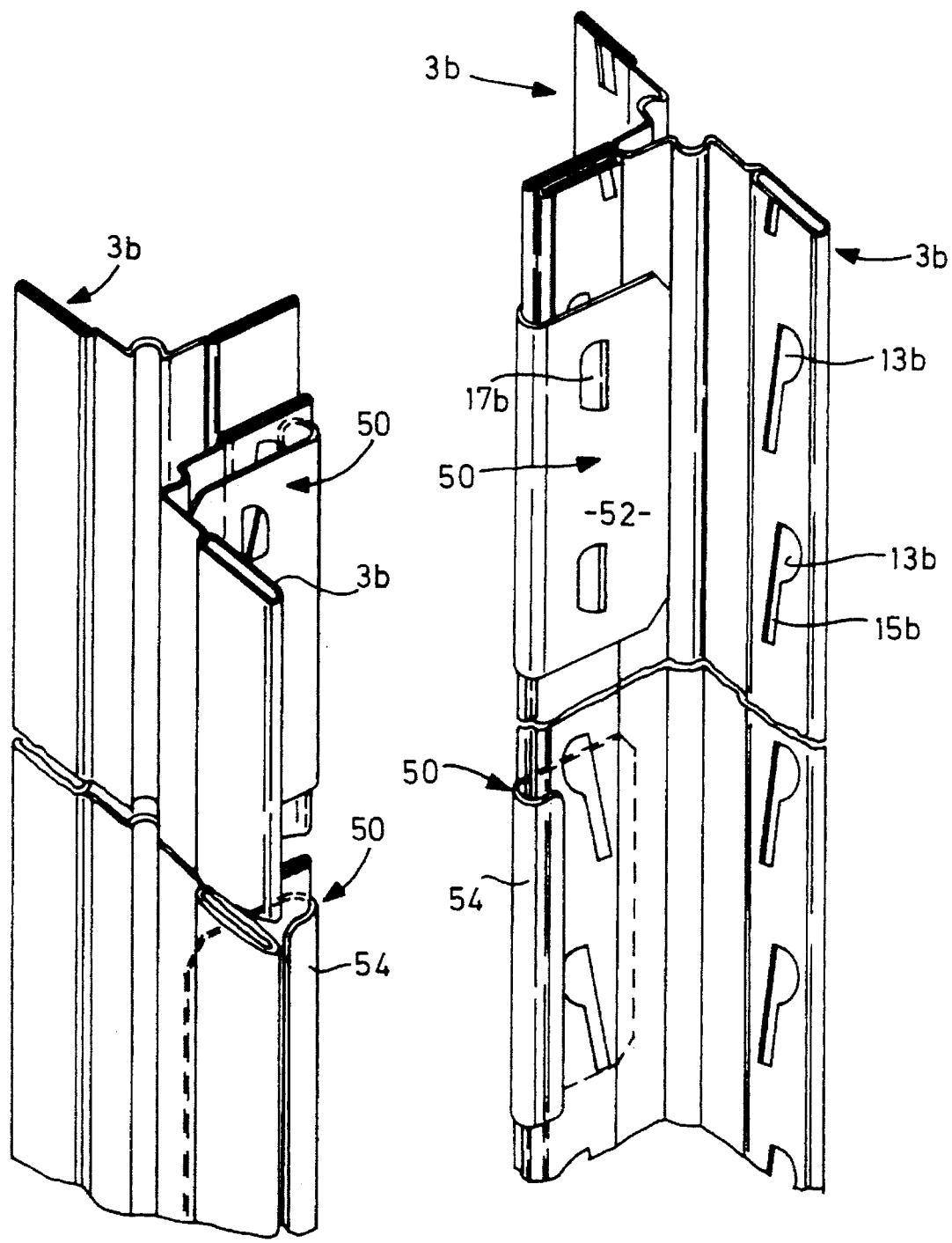
FIG. 14 is a view of adjacent legs being interconnected to form a side by side unit.

The apertures 11 and attachment means 17 may also be used to assemble alternative configurations of shelving units. It is sometimes desirable to assemble a pair of units side by side, as shown in ghosted outline in FIG. 1 and in order to provide a unitary structure it is preferable to interconnect the adjacent units. As shown in FIGS. 14 through 16, this is readily accomplished by incorporating the attachment means 17 into a J-shaped connecting plate 50.

The plate 50 includes a generally planar body 52 with a pair of attachment means 17b integrally formed in the body 52. Each attachment means includes a neck 19b and head 21b arranged to fit within the apertures 13b in respective posts 1b. However, unlike the bridging member 44, each of the necks 19b are oriented generally parallel to the axis of the posts 3b but are still able to slide partially within the slot 15b. This arrangement avoids the need for handed connecting plates 50.

The body of the connecting plate 50 terminates in a hook 54 which is dimensioned to pass snugly around the outer edges of a pair of adjacent posts 3b. To connect a pair of shelving units into an integral structure, each of the units is assembled as described above. The completed units are then positioned so that pairs of posts 3b abut side by side. With most configurations this will provide a pair of abutting posts at both the front and back of the units. A pair of plates 50 are then attached to each pair of posts 3b at vertically spaced locations. The plates 50 are attached by inserting the heads 21b into the apertures 15b with the hook 54 extending around both edges of the posts 3b. The plates 50 may then be slid along the post 3b to cause the neck 19b to engage the slot 15b. The hooks 54 are then effective to hold the posts 3b together and provide an integral structure.

It will be noted from FIG. 14 that the plates 50 associated with each pair of posts 3b are arranged to face in opposite directions so that the attachment means 15b of one plate 50 engages one of the posts 3b and the attachment means 15b of the other plate 50 engages the other post 3b. This arrangement further inhibits separation of the units 1 when subjected to relative fore and aft movement as one hook 54 of each pair of plates 50 will oppose such motion.

It will be seen therefore that a simple, versatile shelving unit is provide that facilitates assembly and yet provides a stable structure.

I claim:

1. A framework comprising a plurality of post members mutually spaced from one another in generally parallel relationship and each including a pair of faces disposed perpendicular to one another, a plurality of support members extending between respective pairs of said post members, each of said support members including an abutment face and being delimited at opposite ends by an edge extending normal to a longitudinal axis of said support member, and attachment means for connecting said support members to said post members with portions of said abutment face of a support member and a face of an associated one of the post members being juxtaposed, said attachment means comprising an aperture in one of said juxtaposed faces and having a hole and a slot extending therefrom and a neck with a head portion extending therefrom projecting from the other of said juxtaposed faces, said head portion being cooperatively shaped to pass through said hole and said neck to slide within said slot, said neck portion and slot being configured to bring said edge of a support member into abutment with an abutment surface on an associated one of the post members upon relative sliding movement of said neck portion within said slot and thereby inhibiting further sliding of the neck portion within the slot, said abutment surface including a rib extending along a longitudinal axis of said post member and projecting between the faces of said post member to maintain said edges of the support members associated with respective ones of said faces in spaced relationship.

2. A framework according to claim 1 wherein said slot is disposed at an acute angle relative to the longitudinal axis of the post member.

3. A framework according to claim 2 wherein said apertures are formed in said faces of said post member.

4. A framework according to claim 2 wherein each of said faces of said post member is provided on a respective leg of said post member and said apertures are formed therein, each of said legs further including a wall spaced from said face to define a cavity disposed behind said face to receive said head portion when said neck portion is received in said slot.

5. A framework according to claim 1 wherein said support member terminates in a flange that extends between said rib and said face and lateral edge portions extend from said support member to abut said rib.

6. A framework according to claim 5 wherein said support member includes a ledge at opposite sides of said abutment face and lateral edges of said ledges abut said rib when said flange is located behind said rib.

7. A framework according to claim 1 wherein said rib is partly cylindrical.

8. A framework according to claim 1 wherein said rib overlies a portion of each of said legs to define a recess therebetween and a terminal portion of said support member is received in said recess when said support member abuts said abutment surface.

9. A framework according to claim 1 wherein said neck and head portion are integrally formed with one of said juxtaposed faces.

10. A framework according to claim 9 wherein said head portion is partly cylindrical.

11. A framework according to claim 10 wherein said neck portion is a planar web disposed generally perpendicular to said abutment face.

12. A framework according to claim 11 wherein said head portion is disposed parallel to and spaced from said abutment face.

13. An attachment means to interconnect a pair of frame members disposed end to end in a framework with their longitudinal axes aligned, each frame member having a pair of orthogonally disposed legs extending from an apex, said attachment means comprising a pair of support members to extend between adjacent ends of aligned legs of said pair of frame members to interconnect said legs of said pair of frame members, said support member overlying adjacent portions of each of said frame members so that each leg of each frame member is juxtaposed with said support member, said support member being secured to respective ones of each of said legs by interengagement of a connector having a head portion and a neck portion on one of said juxtaposed members with an aperture on the other of said juxtaposed members, said aperture having a hole and a slot extending therefrom, said head portion being cooperatively shaped to pass through said hole and permit said neck portion to slide within said slot, said neck portion and said slot being configured to bring an edge of each of said support members into engagement with an abutment surface on respective legs of each of said frame members upon relative sliding of said neck portion within said slot.

14. An attachment means according to claim 13 wherein said neck portion and head portion are formed on said support member.

15. An attachment means according to claim 13 wherein said frame members each include a pair of faces disposed perpendicular to one another and a connecting member extends across each pair of aligned faces of said frame members to secure them in end to end relationship.

16. An attachment means according to claim 15 wherein said slots associated with each face is inclined relative to the longitudinal axis of said frame members, said abutment surface being located adjacent an intersection of said faces.

17. An attachment means according to claim 16 wherein a rib is formed at said intersection and provides said abutment faces.

18. An attachment means according to claim 13 wherein said slot is inclined at an acute angle to the longitudinal axis of said frame members.

19. A post member for use in a framework comprising a pair of legs disposed generally perpendicular to one another to provide a pair of inwardly directed opposed faces, and apertures formed in each of said opposed faces to permit a support member to be secured to respective legs, each of said apertures including a hole to receive a head portion formed on the support member and a slot to receive a neck securing the head portion to the support member and permit sliding movement of the neck within the slot, each of said legs including a cavity disposed behind said face to accommodate the head portion when the neck portion is received in the slot, said cavity being defined between a pair of spaced webs, one of which is pierced to provide said aperture and the other of which presents a continuous outwardly directed surface, said one web terminating prior to an apex of said post member and said other web being jogged inwardly to provide a coplanar continuation of said opposed face toward said apex.

20. A post member according to claim 19 wherein said other web extends inwardly to intersect said other leg at an apex of the post.

21. A port member according to claim 20 wherein an inwardly directed rib is provided at said apex and extends along the longitudinal axis of said post member.

22. A post member according to claim 21 wherein said webs are spaced apart a distance to receive the head portion snugly therebetween.

23. A post member according to claim 22 wherein said webs are interconnected at their distal edge remote from said apex.

24. A post member according to claim 21 wherein said slot is disposed at an acute angle relative to the longitudinal axis of the post member.

25. A framework comprising a plurality of post members mutually spaced from one another in generally parallel relationship and each including a pair of faces disposed perpendicular to one another, a plurality of support members extending between respective pairs of said post members, each of said support members including an abutment face and being delimited at opposite ends by an edge extending normal to the longitudinal axis of said support member, and attachment means for connecting said support members to said post members with portions of said abutment face of a support member and a face of the post member being juxtaposed, said attachment means comprising an aperture in one of said juxtaposed faces and having a hole and a slot extending therefrom and a neck with a head portion extending therefrom projecting from the other of said juxtaposed faces, said head portion being co-operatively shaped to pass through said hole and said neck to slide within said slot, said slot extending from said hole to provide a linear edge delimiting said hole and slot and inclined to the longitudinal axis of said post, said neck portion and slot being configured to bring said edge of said support member into abutment with an abutment surface on the post member upon relative sliding movement of said neck portion within said slot and thereby inhibiting further sliding of the neck portion within the slot.

26. A framework according to claim 25 wherein said neck portion is formed as a planar web projecting substantially normal to said other face and said head portion is disposed to one side of said web and generally parallel to said other face.

27. A framework according to claim 26 wherein said hole and said head portion are semicircular.

28. A framework according to claim 26 wherein said neck portion and head portion are integrally formed with the member associated with said other face.

29. A framework according to claim 28 wherein said other face is associated with said support members.

30. A post member for use in a framework comprising a pair of legs disposed generally perpendicular to one another to provide a pair of inwardly directed opposed faces and apertures for use in each of said opposed faces to permit a support member to be secured to respective legs, each of said apertures including a hole to receive a head portion formed on the support member and a slot to receive a neck securing the head portion to the support member, said slot extending from said hole to provide a linear edge delimiting said hole and slot and inclined to the longitudinal axis of said post to permit sliding movement of said neck within said slot.

31. A post member according to claim 30 wherein said hole is semicircular.

32. A post member according to claim 30 wherein each of said legs includes a wall spaced from the face to define a cavity disposed behind said face to accommodate said head portion when said neck portion is received in said slot.

33. A post member according to claim 32 wherein said cavity is defined by a pair of spaced webs, one of which includes said face and another of which presents a continuous, outwardly directed surface.

34. A post member according to claim 33 wherein said hole is semicircular and said slot is rectangular.

35. An attachment means to interconnect a pair of frame members in side by side relationship with longitudinal edges aligned, said attachment means comprising a connecting plate to be secured to one of said frame members and having a hook formed along one edge thereof to extend from said one frame member across said aligned edges and engage said other frame member, said connecting plate being secured to said one frame member by interengagement of a hooked connector with an aperture, said aperture being formed in one of said frame members and connecting plate, and having a hole and a slot extending therefrom and said hooked connector projecting from the other of said frame members and connecting plate and having a head portion extending from a neck portion, said head portion being cooperatively shaped to pass through said hole and permit said neck portion to slide within said slot, said neck portion and slot being configured to bring said hook into abutment with one of said aligned edges to inhibit relative lateral movement of said frame members.

36. An attachment means according to claim 35 wherein said slots are inclined relative to the longitudinal axis of said frame members.

37. An attachment means according to claim 35 wherein said apertures are formed in each of said frame members.

38. An attachment means according to claim 37 wherein said neck is formed as a planar web integral with said connecting plate and said web is disposed generally parallel to said hook to permit sliding engagement with slots in either of said frame members.

* * * * *